(12) United States Patent
Ju et al.

(10) Patent No.: US 11,127,218 B2
(45) Date of Patent: Sep. 21, 2021

(54) METHOD AND APPARATUS FOR CREATING AUGMENTED REALITY CONTENT

(71) Applicant: ALCHERA INC., Seongnam-si (KR)

(72) Inventors: Sugang Ju, Hwaseong-si (KR); Jung Woo Chang, Seoul (KR); Young Kyoo Hwang, Suwon-si (KR); Jung Bae Kim, Seoul (KR)

(73) Assignee: ALCHERA INC., Seongnam-si (KR)

( * ) Notice: Subject to any disclaimer, the term of this patent is extended or adjusted under 35 U.S.C. 154(b) by 0 days.

(21) Appl. No.: 16/730,232

(22) Filed: Dec. 30, 2019

(65) Prior Publication Data

US 2021/0150815 A1    May 20, 2021

(30) Foreign Application Priority Data

Nov. 20, 2019   (KR) .......................... 10-2019-0149917

(51) Int. Cl.
*G06T 19/00* (2011.01)
*G06T 7/70* (2017.01)
*G06T 17/20* (2006.01)

(52) U.S. Cl.
CPC .............. *G06T 19/006* (2013.01); *G06T 7/70* (2017.01); *G06T 17/20* (2013.01); *G06T 2200/08* (2013.01); *G06T 2200/24* (2013.01)

(58) Field of Classification Search
None
See application file for complete search history.

(56) References Cited

U.S. PATENT DOCUMENTS

| 2010/0293569 | A1* | 11/2010 | Kusumoto | G06Q 30/0239 725/23 |
| 2013/0063487 | A1* | 3/2013 | Spiegel | G06Q 30/02 345/633 |
| 2018/0213359 | A1* | 7/2018 | Reinhardt | G06T 7/74 |
| 2019/0147245 | A1* | 5/2019 | Qi | G06K 9/3233 382/103 |

FOREIGN PATENT DOCUMENTS

| KR | 10-2010-0014198 A | 2/2010 |
| KR | 10-2013-0107917 A | 10/2013 |
| KR | 10-1869848 B1 | 6/2018 |

* cited by examiner

*Primary Examiner* — Yi Wang
(74) *Attorney, Agent, or Firm* — Sughrue Mion, PLLC

(57) ABSTRACT

Disclosed herein is a method for creating augmented reality content. The method for creating augmented reality content includes: extracting a target area, to which augmented reality content will be applied, from an object included in an image; providing a template for the creation of the augmented reality content that will be applied to the extracted target area; when a user inputs user content via the template, creating the augmented reality content by using the user content and the metadata of the target area; and performing rendering so that the created augmented reality content is applied to the target area of the image.

18 Claims, 8 Drawing Sheets

METHOD AND APPARATUS FOR CREATING AUGMENTED REALITY CONTENT

CROSS-REFERENCE TO RELATED APPLICATION

This application claims the benefit of Korean Patent Application No. 10-2019-0149917 filed on Nov. 20, 2019, which is hereby incorporated by reference herein in its entirety.

BACKGROUND

1. Technical Field

Embodiments disclosed herein relate generally to a method and apparatus for creating augmented reality content, and more specifically to a method and apparatus that enable a user to directly create augmented reality content intended to be applied to an object included in an image.

This work was supported by Institute of Information & Communications Technology Planning & Evaluation (IITP) grant funded by the Korea government (MSIT)(No. 2017-0-01445-003, The Development of Deep Learning based Mobile Markerless AR App for Smart IOT).

2. Description of the Related Art

Recently, the number of people using social media has been gradually increasing. Live internet broadcasting, which is a representative form of social media, is different from media such as TV broadcasting in that a general user can be a broadcaster and a broadcaster and a viewer can communicate with each other. For example, a viewer can deliver his or her opinion or requirements through a chat window while viewing a live broadcast, and can express his or her support by donating an item corresponding to money to a broadcaster.

In order to induce users to more actively participate in social media, various communication methods need to be provided. Therefore, there is an increasing need for the development of related technology.

Meanwhile, the above-described background technology corresponds to technical information that has been possessed by the present inventor in order to contrive the present invention or which has been acquired in the process of contriving the present invention, and can not necessarily be regarded as well-known technology which had been known to the public prior to the filing of the present invention.

SUMMARY

Embodiments disclosed herein are directed to a method and apparatus that enable a user viewing an image to directly create augmented reality content intended to be applied to an object included in an image.

According to an aspect of the present invention, there is provided a method for creating augmented reality content, the method including: extracting a target area, to which augmented reality content will be applied, from an object included in an image; providing a template for the creation of the augmented reality content that will be applied to the extracted target area; when a user inputs user content via the template, creating the augmented reality content by using the user content and the metadata of the target area; and performing rendering so that the created augmented reality content is applied to the target area of the image.

According to another aspect of the present invention, there is provided a non-transitory computer-readable storage medium having stored thereon a program that performs a method for creating augmented reality content, wherein the method for creating augmented reality content includes: extracting a target area, to which augmented reality content will be applied, from an object included in an image; providing a template for the creation of the augmented reality content that will be applied to the extracted target area; when a user inputs user content via the template, creating the augmented reality content by using the user content and the metadata of the target area; and performing rendering so that the created augmented reality content is applied to the target area of the image.

According to another aspect of the present invention, there is provided a computer program that is executed by an apparatus for creating augmented reality content and is stored in a storage medium to perform a method for creating augmented reality content, wherein the method for creating augmented reality content includes: extracting a target area, to which augmented reality content will be applied, from an object included in an image; providing a template for the creation of the augmented reality content that will be applied to the extracted target area; when a user inputs user content via the template, creating the augmented reality content by using the user content and the metadata of the target area; and performing rendering so that the created augmented reality content is applied to the target area of the image.

According to still another aspect of the present invention, there is provided an apparatus for creating augmented reality content, the apparatus including: a communication interface configured to communicate with an external device in order to transmit and receive data to and from the external device; a memory configured to store a program for the creation of augmented reality content; and a controller configured to create augmented reality content by executing the program; wherein the controller is further configured to extract a target area, to which the augmented reality content will be applied, from an object included in an image received via the communication interface, to provide a template for creation of the augmented reality content, to be applied to the extracted target area, to a user terminal via the communication interface, to, when a user inputs user content via the template, create the augmented reality content by using the user content and the metadata of the target area, and to perform rendering so that the created augmented reality content is applied to the target area of the image.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
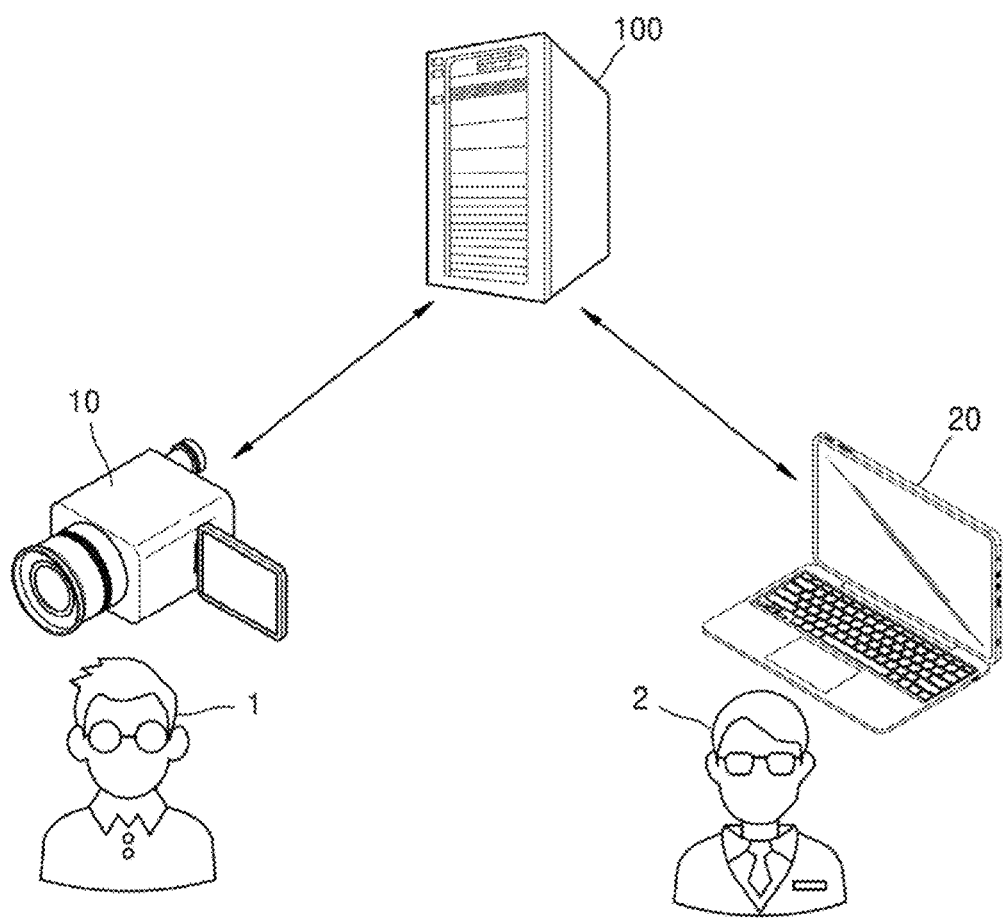
FIG. 1 is a view showing a social media system that supports a method for creating augmented reality content according to an embodiment.

Various embodiments will be described in detail below with reference to the accompanying drawings. The following embodiments may be modified to various different forms and then practiced. In order to more clearly illustrate the features of the embodiments, detailed descriptions of items that are well known to those having ordinary skill in the art to the following embodiments pertain will be omitted. In the drawings, portions unrelated to the following description will be omitted. Throughout the specification, similar reference symbols will be assigned to similar portions.

Throughout the specification and the claims, when one component is described as being "connected" to another component, the one component may be "directly connected" to the other component or "electrically connected" to the other component through a third component. Furthermore, when any portion is described as including any component, this does not mean that the portion does not exclude another component but means that the portion may further include another component, unless explicitly described to the contrary.

FIG. 1 is a view showing a social media system that supports a method for creating augmented reality content according to an embodiment. Referring to FIG. 1, the social media system according to the present embodiment may include a camera 10, a server 100, and a user terminal 20.

The camera 10 transmits a photographed image of a broadcaster 1 to the server 100.

The server 100 receives the photographed image from the camera 10 and then transmits the photographed image to the user terminal 20, thereby providing a live broadcast service. Furthermore, the server 100 may provide support so that augmented reality content directly created by a user 2 is applied to an image that is broadcast in real time. In other words, the server 100 may practice the method for creating augmented reality content according to the present embodiment. Although the embodiment in which the server 100 performs two roles, i.e., the provision of a live broadcast service and the creation of augmented reality content, is illustrated in FIG. 1, two separate servers may perform the provision of a live broadcast service and the creation of augmented reality content, respectively.

A detailed description of the server 100 performing a process for the creation of augmented reality content will be given later.

The user terminal 20 may display the image received from the server 100 on a screen, and the user 2 may view a live broadcast via the user terminal 20. Furthermore, the user terminal 20 may provide a user interface (UI) for the creation of augmented reality content to the user 2, and the user 2 may directly create desired augmented reality content via the UI and apply the augmented reality content to an image that is broadcast in real time.

The user terminal 20 may directly perform at least part of a process included in the method for creating augmented reality content. However, in the present embodiment, it is assumed that the server 100 performs the overall process of the method for creating augmented reality content and the user terminal 20 simply displays the UI for the creation of augmented reality content on a screen via communication with the server 100.

The user terminal 20 may be implemented using a computing device capable of performing image output, such as a desktop, a notebook, a smartphone, or the like. The user 2 may make a request for the creation of augmented reality content to be applied to the image at a desired point in time while viewing the image in real time via the user terminal 20, and the user terminal 20 may transmit the request to the server 100, thereby allowing a process for the creation of the augmented reality content to be initiated.

Meanwhile, although the case in which the server 100 supports the creation of augmented reality content in the social media system in which an image is broadcast in real time via the server 100 is illustrated in FIG. 1 as an example, a computing device capable of displaying an image, such as the user terminal 20, may support the creation of augmented reality content in anther embodiment, in which case the user terminal 20 may also support the creation of augmented reality content to be applied to an image stored in the user terminal 20 other than an image that is received from the outside and played back in real time.

Figure 2:
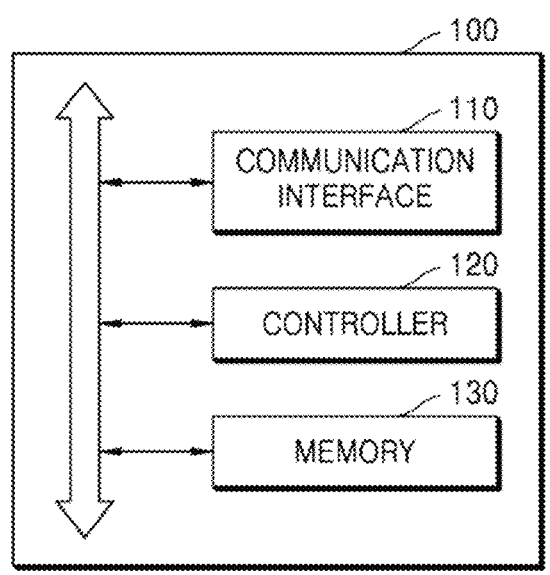
FIG. 2 is a block diagram illustrating the configuration of an apparatus for creating augmented reality content according to an embodiment.

FIG. 2 is a block diagram illustrating the configuration of an apparatus for creating augmented reality content. The apparatus for creating augmented reality content, which is shown in FIG. 2, corresponds to the server 100 of FIG. 1. As described above, the server 100 according to the present embodiment provides a live broadcast service and, simultaneously, performs a process for the creation of augmented reality content.

Referring to FIG. 2, the server 100 according to the present embodiment may include a communication interface 110, a controller 120, and a memory 130.

The communication interface 110 is a component configured to transmit and receive data to and from an external device, and may support wired/wireless communication using various methods. For example, the communication interface 110 may receive a photographed image of the broadcaster 1 from the camera 10. Furthermore, the communication interface 110 may transmit the image received from the camera 10 to the user terminal 20, and may transmit and receive data to and from the user terminal 20 in order to perform a process required for the creation of augmented reality content. For this purpose, the communication interface 110 may be implemented using a communication chipset configured to support various communication protocols.

The controller 120 is a component including at least one processor, such as a central processing unit (CPU), and controls the overall operation of the server 100. The controller 120 may provide a live broadcast service by executing a program previously stored in the memory 130, and may perform a process for the creation of augmented reality content to be applied to an image that is broadcast in real time.

In other words, the controller 120 may transmit the image received from the camera 10 to the user terminal 20 in real time, may provide a tool for the creation of augmented reality content to the user 2 via the user terminal 20, and may create augmented reality content and apply the augmented reality content to an image broadcast in real time in response to the input of the user 2 via the tool.

The memory 130 may store various types of programs and data. In particular, the memory 130 may store a program for the creation of augmented reality content to be applied to an image, and may store a program for the provision of a live broadcast service.

A process that is performed by the controller 120 in order to create augmented reality content to be applied to an image will be described in detail below with reference to the flowcharts of FIGS. 3 to 6.

FIGS. 3 to 6 are flowcharts illustrating methods for creating content according to embodiments.

Figure 3:
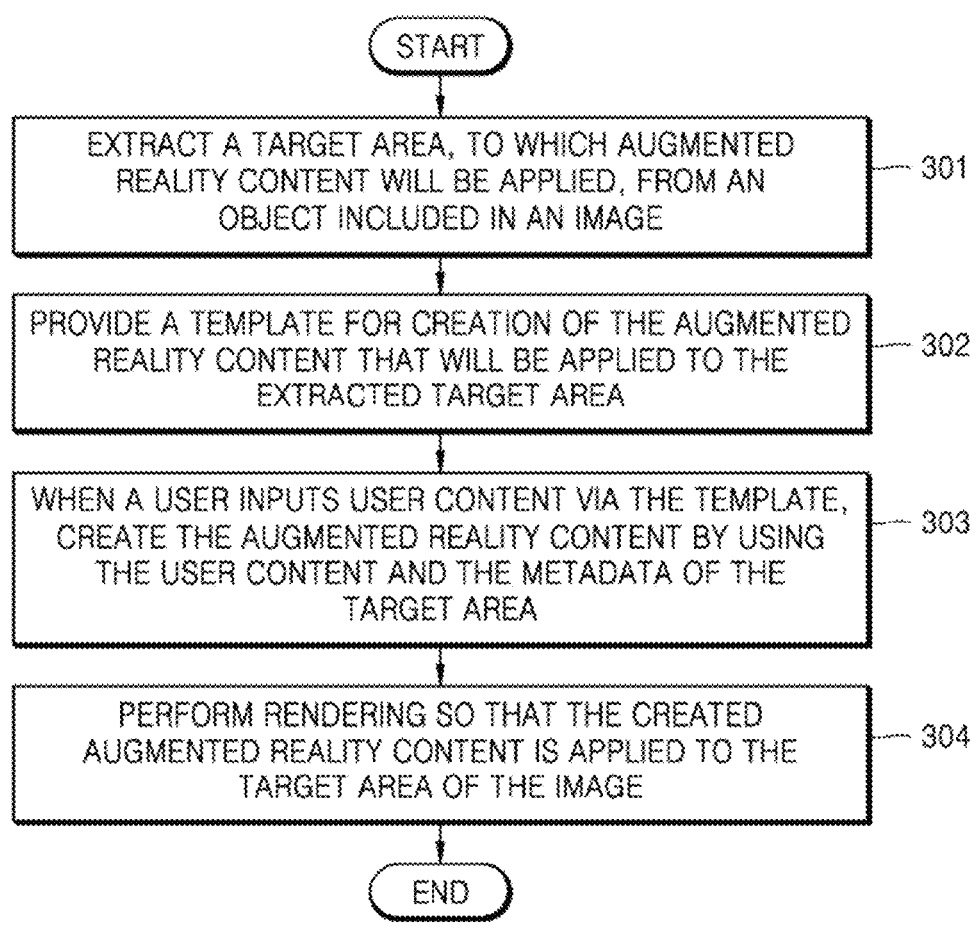
FIGS. 3 to 6 are flowcharts illustrating methods for creating content according to embodiments.

Referring to FIG. 3, at step 301, the controller 120 extracts a target area, to which augmented reality content will be applied, from an object included in an image received from the camera 10. For example, the controller 120 may extract the face of a human included in an image as the target area to which augmented reality content will be applied. Alternatively, the controller 120 may extract another body part (e.g., a hand, an arm, a leg, or the like) of the human included in the image as the target area, or may extract a part or all of an object other than a human as the target area. In the present embodiment, it is assumed that the controller 120 extracts the face of the broadcaster 1 included in the image as the target area.

Meanwhile, a part of an object in an image that is extracted as the target area by the controller 120 at step 301 may be set in advance, or may be selected by the user 2 via the user terminal 20. For example, the user 2 may acquire the right to apply augmented reality content to an image in return for a donation to the broadcaster 1. In this case, the user 2 may be allowed to select the target area.

When the controller 120 attempts to extract the target area but fails at step 301, the controller 120 may allow the user 2 to select another target area, or may wait until the target area appears in the image. For example, when the controller 120 attempts to extract the face of a human included in the image as the target area but the face of the human does not appear in the image, the controller 120 may request the user 2 to select another body part other than the face of the human as the target area via the user terminal 20. Alternatively, the controller 120 may wait until the face of the human appears in the image, and may then extract the target area.

The controller 120 may extract the target area by analyzing the image. A detailed method by which the controller 120 extracts the target area will be described below with reference to FIGS. 4 and 5.

Figure 4:
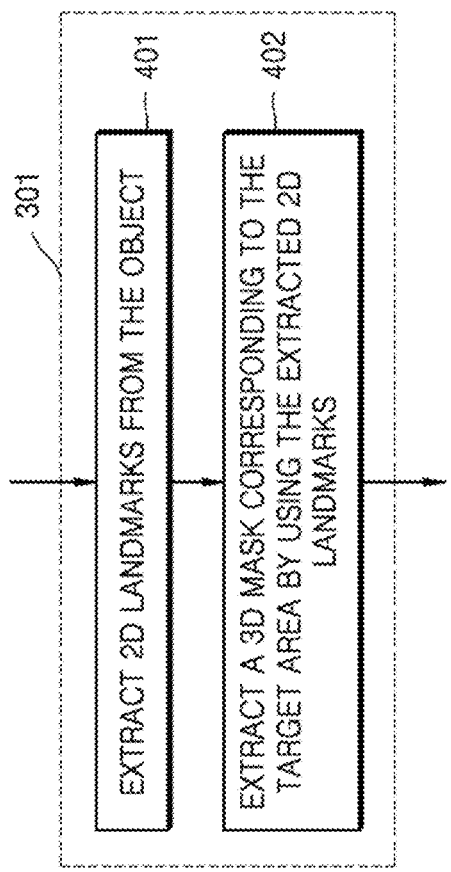

FIG. 4 is a flowchart illustrating detailed steps included in step 301 of FIG. 3. Referring to FIG. 4, the controller 120 may extract two-dimensional (2D) landmarks from an object included in the image at step 401. In this case, the term "2D landmark" refers to a spot corresponding to a specific region of an object within an image. For example, when the object is a human, the eyes, the nose, the mouth, the eyebrows, and the face lines may be extracted from the face of the human as the 2D landmarks, or the hands, the feet, the arms, the legs, the waist, and the shoulder may be extracted from the body as the 2D landmarks. The controller 120 may extract the 2D landmarks by analyzing the RGB data of pixels that constitute the image.

At step 402, the controller 120 extracts a three-dimensional (3D) mask corresponding to the target area by using the 2D landmarks extracted at step 401. In this case, the term "3D mask" refers to the range of the image that is a target to which augmented reality content will be applied. When the face of a human included in the image is the target area as in the present embodiment, the surface of the face represented in a 3D space is the 3D mask.

A detailed process by which the controller 120 extracts a 3D mask corresponding to a target area by using 2D landmarks will be described with reference to FIG. 5.

Figure 5:
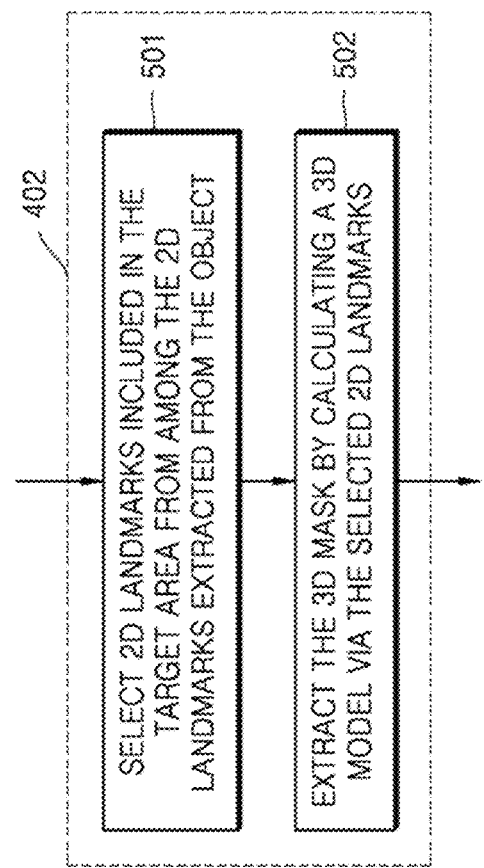

FIG. 5 is a flowchart illustrating detailed steps included in step 402 of FIG. 4. Referring to FIG. 5, the controller 120 selects 2D landmarks included in the target area from among the 2D landmarks extracted from the object at step 501. For example, when the eyes, nose, mouth, eyebrows, face lines, hands, feet, arms, legs, waist, and shoulder of a human are extracted as the 2D landmarks at step 401, the controller 120 selects the eyes, the nose, the mouth, the eyebrows, and the face lines, which are 2D landmarks included in the face, i.e., the target area, from among the former landmarks.

At step 502, the controller 120 extracts a 3D mask by calculating a 3D model via the 2D landmarks selected at step 501. For example, the controller 120 extracts a 3D model corresponding to the face by calculating a 3D mask using the locations of the eyes, the nose, the mouth, the eyebrows, and the face lines, which are the selected 2D landmarks.

Referring back to FIG. 3, the controller 120 provides a template for the creation of augmented reality content to be applied to the target area at step 302. In other words, the controller 120 may provide a tool for the creation of augmented reality content to the user 2 via the UI of the user terminal 20.

The user 2 may create the augmented reality content by a method of inputting user content to a template that is displayed on the user terminal 20. In this case, the "user content" refers to a still image, a moving image, or the like that is directly input by the user 2 in order to create augmented reality content. For example, the user 2 may draw a still image directly on the template, or may fetch a previously stored still image, a previously stored moving image, or the like and place it at a desired location on the template.

In this case, the controller 120 may determine the form of the template to be provided based on the selection of the user 2 or previously stored information about the user 2. This will be described in detail below with reference to FIG. 6.

Figure 6:
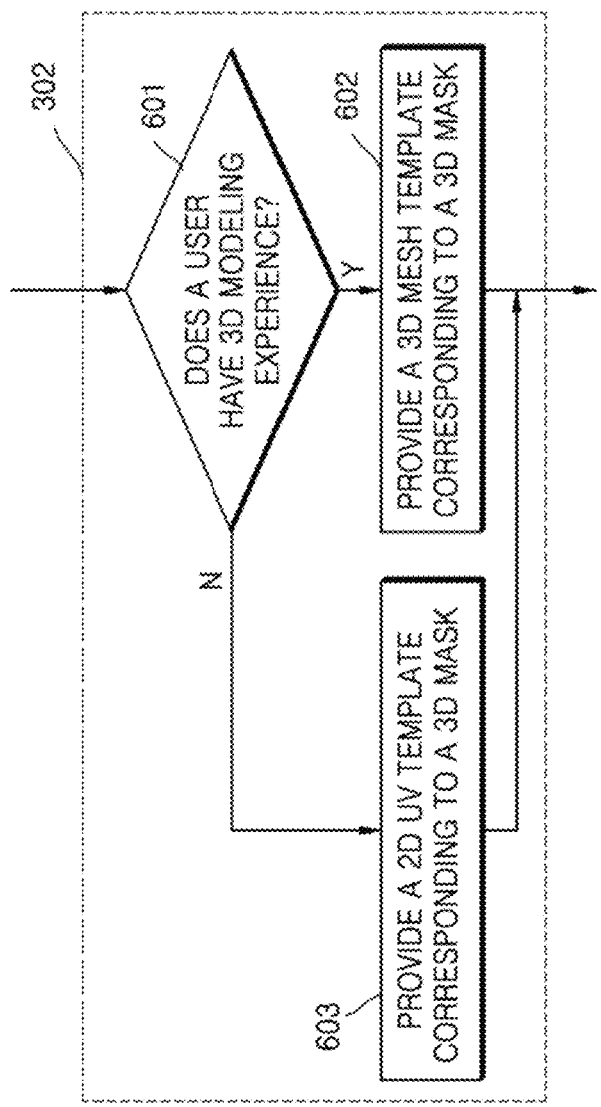

FIG. 6 is a flowchart illustrating detailed steps included in step 302 of FIG. 3. Referring to FIG. 6, the controller 120 determines whether or not the user 2 has 3D modeling experience at step 601. In other words, the controller 120 determines whether or not the user 2 has the capability to handle a 3D graphic tool. The information about the user 2 may be stored in the memory 130 in advance, or may be checked in such a way that the controller 120 inquires the information about the user 2 from the user 2 via the user terminal 20 before the provision of the template.

When as a result of the determination, it is determined that the user 2 has 3D modeling experience, the process proceeds to step 602, at which the controller 120 provides a 3D mesh template corresponding to the 3D mask to the user 2 via the user terminal 20. The user 2 may directly create augmented reality content through 3D modeling on the 3D mesh template.

In contrast, when as a result of the determination, it is determined that the user 2 does not have 3D modeling experience, the process proceeds to step 603, at which the controller 120 displays the 2D UV template corresponding to the 3D mask on the user terminal 20. In this case, the 2D UV template is obtained by transforming the 3D mask into a UV coordinate system. The user 2 may easily create augmented reality content by inputting user content onto the 2D UV template.

Meanwhile, the controller 120 may provide a 3D preview along with the 2D UV template. When the user 2 inputs user content onto the 2D UV template, a state in which the input user content has been applied to the 3D mask may be displayed on the user terminal 20 as the 3D preview.

As described above, different types of templates are provided depending on whether or not the user 2 has knowledge about 3D modeling, and thus an advantage arises in that even when the user 2 does not have the capability to handle a 3D graphic tool, he or she may easily create content.

Although the embodiment in which the controller 120 determines the type of template to be provided based on information about the user 2 is illustrated in FIG. 6, the user 2 may be allowed to select the type of template via the user terminal 20 before the provision of the template.

An example in which when the user 2 inputs user content onto the 2D UV template, a state in which the input user content has been applied to the 3D mask is displayed on the 3D preview will be described below with reference to FIG. 7.

Figure 7:
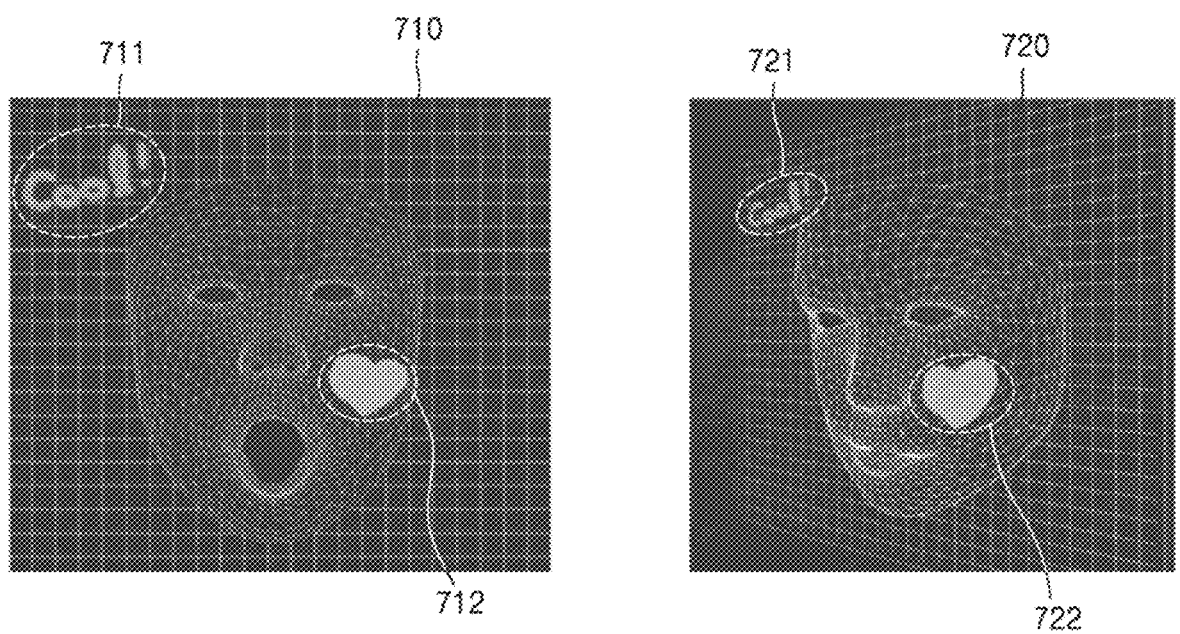
FIG. 7 shows screens that are displayed on a user terminal at the step of providing a template for the creation of content to a user in a method for creating augmented reality content according to an embodiment.

FIG. 7 shows screens that are displayed at the step of providing a template for the creation of content to a user in a method for creating augmented reality content according to an embodiment.

A 2D UV template 710 is displayed on the left side of FIG. 7, and a 3D preview 720 is displayed on the right side thereof. The 2D UV template 710 is displayed on the user terminal 20. The user 2 may input user content onto the template via the user terminal 20, and may view a preview to which the result of the input is applied.

Referring to FIG. 7, when the user 2 inputs two images 711 and 712 onto the 2D UV template 710 as user content, the two images 721 and 722 are also displayed on the 3D preview 720, and thus a state in which actual augmented reality content is displayed is shown.

The user 2 may easily create augmented reality content by a method of attaching a 2D image onto the 2D UV template 710. It may be possible to immediately view the 3D preview 720 to which an image is applied while performing the work of attaching the corresponding image, and thus an advantage arises in that the user 2 may easily create augmented reality content.

Meanwhile, the controller 120 may provide a template of a type different from that of the above-described example. According to an embodiment, the controller 120 may photograph a body part of the user 2 corresponding to the target area via a camera provided in the user terminal 20, and may provide the photographed image as the template.

For example, when the target area to which augmented reality content is applied is the face of the broadcaster 1 included in an image, the user 2 photographs his or her own face by using the camera of the user terminal 20, and inputs user content onto his or her own face displayed on the screen of the user terminal 20. The controller 120 may transform input user content into UV data, and may apply the resulting UV data to the 3D mask of the target area.

Referring back to FIG. 3, at step 303, when the user 2 inputs user content via the template, the controller 120 may create augmented reality content by using the input user content and the metadata of the target area. In greater detail, the controller 120 may create augmented reality content by extracting the metadata of the target area and then combining the metadata with data representing the user content input by the user 2. In this case, the controller 120 may perform the calculation of the data representing the user content by using the metadata of the target area so that the created augmented reality content may be displayed on the location of the target area.

Meanwhile, when the 2D UV template has been provided at step 302, the controller 120 may create augmented reality content by performing UV mapping in a state in which input user content has been incorporated into the template and then performing combination with the metadata of the target area. Alternatively, when a photographed image of the user 2 has been provided as the template at step 302, the controller 120 may create augmented reality content by incorporating UV data corresponding to user content input to the template into UV data corresponding to the 3D mask of the target area, pertaining UV mapping, and pertaining combination with the metadata of the target area.

The controller 120 may store the augmented reality content created at step 303 in the memory 130, and may fetch and use the augmented reality content in response to a request from the user 2 in the future.

At step 304, the controller 120 may perform rendering so that the augmented reality content created at step 303 is applied to the target area of the image. In greater detail, the controller 120 may perform rendering by using data generated as a result of the combination of the metadata of the target area and the data representing the user content input to the template so that the augmented reality content is overlapped and displayed on the target area.

In this case, the controller 120 may perform rendering so that the augmented reality content is applied to the target area for a period determined based on a request or payment (e.g., the payment of a donation) of the user 2.

The controller 120 may transmit the rendered image to the user terminal 20. The controller 120 may provide live broadcast service by simultaneously transmitting the rendered image to the user terminals of other users that are not shown in FIG. 1.

Figure 8:
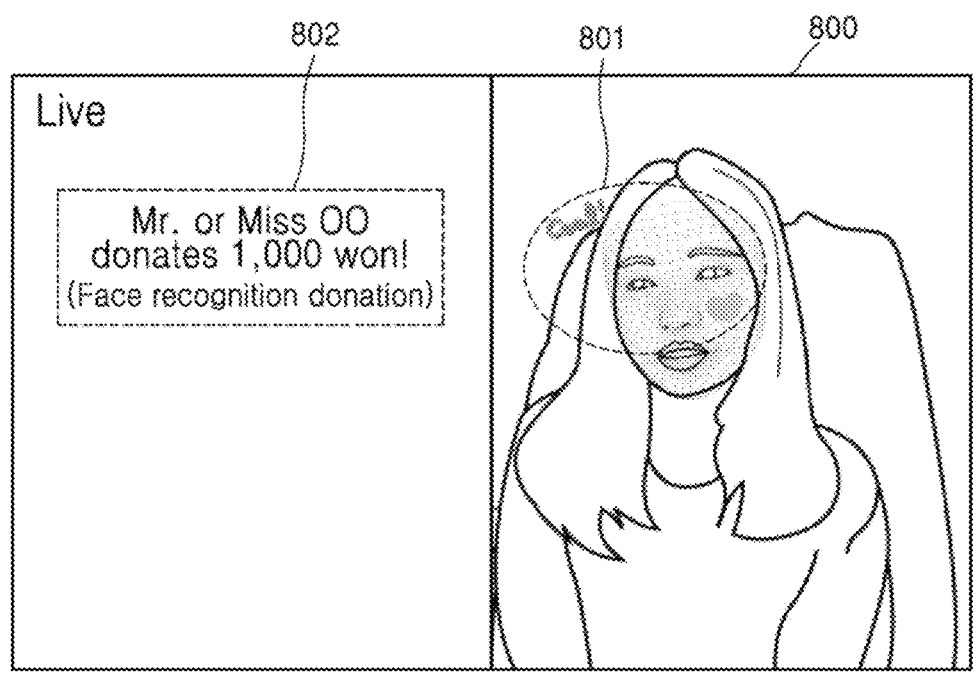
FIG. 8 is a view showing an example in which augmented reality content created by a method for creating augmented reality content according to an embodiment is applied to a live broadcast image.

FIG. 8 is a view showing an example in which augmented reality content created by a method for creating augmented reality content according to an embodiment is applied to a live broadcast image. Referring to FIG. 8, augmented reality content 801 created by inputting user content, as shown in FIG. 7, is overlapped and displayed on a target area within an image 800. Furthermore, a phrase indicating a person who has made a donation in order to directly create the corresponding augmented reality content 801 and apply it to a live broadcast image and the amount of donation is displayed on the left side of the image 800.

As in the embodiments described above, the template for the creation of augmented reality content to be applied to a target area within an image is provided to a user via the UI, and thus effects are achieved in that a user feels interesting because he or she may directly create desired content and apply the content to an image broadcast in real time and in that he or she actively participates in two-way communication through broadcasting.

Furthermore, the type of template to be provided is varied depending on the selection or experience of a user, and thus a barrier to entry to the creation of content is lowered, so that an effect is achieved in that a user who lacks knowledge about 3D modeling may easily create augmented reality content.

The term "unit" used herein means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The method for creating augmented reality according to at least one of the embodiments described in conjunction with FIGS. 3 to 6 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for creating augmented reality according to at least one of the embodiments described in conjunction with FIGS. 3 to 6 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for creating augmented reality according to at least one of the embodiments described in conjunction with FIGS. 3 to 6 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions that are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended merely for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

According to at least any one of the above-described embodiments, a user may directly create augmented reality content and apply the augmented reality content to an image while viewing the image in real time, and thus an effect is expected in that the user may feel more interest and satisfaction, thus leading to active participation in live broadcasting.

Furthermore, an advantage arises in that a user having no 3D modeling experience may easily create 3D augmented reality content by inputting user content via the 2D template.

The effects that may be acquired by the disclosed embodiments are not limited to the above-described effects, and other effects that have not been described above will be clearly understood by those having ordinary skill in the art, to which the disclosed embodiments pertain, from the foregoing description.

The scope of the present invention should be defined by the attached claims, rather than the detailed description. Furthermore, all modifications and variations which can be derived from the meanings, scope and equivalents of the claims should be construed as falling within the scope of the present invention.

What is claimed is:

1. A method for creating augmented reality content, the method comprising:
    extracting a target area, to which augmented reality content is to be applied, from an object included in an image;
    providing a template for creation of the augmented reality content that is to be applied to the extracted target area;
    when a user inputs user content via the template, creating the augmented reality content by using the user content and metadata of the target area; and
    performing rendering so that the created augmented reality content is applied to the target area of the image,
    wherein the template includes any one of a 2D UV template, a 3D mesh template or a photographed image of a body part of the user corresponding to the target area.

2. The method of claim 1, wherein extracting the target area comprises:

extracting two-dimensional (2D) landmarks from the object; and extracting a three-dimensional (3D) mask corresponding to the target area by using the extracted 2D landmarks.

3. The method of claim 2, wherein extracting the 3D mask comprises:

selecting 2D landmarks included in the target area from among the 2D landmarks extracted from the object; and extracting the 3D mask by calculating a 3D model via the selected 2D landmarks.

4. The method of claim 2, wherein providing the template comprises:

providing the 2D UV template corresponding to the 3D mask and a 3D preview;

wherein the 2D UV template is obtained by transforming the 3D mask into a UV coordinate system; and wherein the 3D preview shows a state in which user content has been applied to the 3D mask when the user content is input onto the 2D UV template.

5. The method of claim 2, wherein providing the template comprises:

providing any one of the 2D UV template and the 3D mesh template, or providing the photographed image of a body part of the user corresponding to the target area as the template, based on a selection of the user or previously stored information about the user.

6. The method of claim 1, wherein creating the augmented reality content comprises:

creating the augmented reality content by combining data representing the input user content and metadata of the target area with each other.

7. The method of claim 6, wherein performing the rendering comprises:

performing rendering by using data obtained through the combination so that the created augmented reality content is overlapped and displayed on the target area.

8. The method of claim 1, wherein performing the rendering comprises:

performing rendering so that the created augmented reality content is overlapped and displayed on the target area of the image for a period that is determined based on a request and payment of the user.

9. A non-transitory computer-readable storage medium having stored thereon a program that performs the method set forth in claim 1.

10. A computer program that is executed by an apparatus for creating augmented reality content and is stored in a storage medium to perform the method set forth in claim 1.

11. An apparatus for creating augmented reality content, the apparatus comprising:

a communication interface configured to communicate with an external device in order to transmit and receive data to and from the external device;

a memory configured to store a program for creation of augmented reality content; and a controller configured to create augmented reality content by executing the program;

wherein the controller is further configured to extract a target area, to which the augmented reality content is to be applied, from an object included in an image received via the communication interface, to provide a template for creation of the augmented reality content, to be applied to the extracted target area, to a user terminal via the communication interface, to, when a user inputs user content via the template, create the augmented reality content by using the user content and metadata of the target area, and to perform rendering so that the created augmented reality content is applied to the target area of the image, wherein the template includes any one of a 2D UV template, a 3D mesh template or a photographed image of a body part of the user corresponding to the target area.

12. The apparatus of claim 11, wherein the controller is further configured to extract the target area by extracting two-dimensional (2D) landmarks from the object and extracting a three-dimensional (3D) mask corresponding to the target area by using the extracted 2D landmarks.

13. The apparatus of claim 12, wherein the controller is further configured to extract the 3D mask by selecting 2D landmarks included in the target area from among the 2D landmarks extracted from the object and extracting the 3D mask by calculating a 3D model via the selected 2D landmarks.

14. The apparatus of claim 12, wherein the controller is further configured to provide the template to the user terminal by providing the 2D UV template corresponding to the 3D mask and a 3D preview, the 2D UV template is obtained by transforming the 3D mask into a UV coordinate system, and wherein the 3D preview shows a state in which user content has been applied to the 3D mask when the user content is input onto the 2D UV template.

15. The apparatus of claim 12, wherein the controller is further configured to provide the template to the user terminal by providing any one of the 2D UV template and the 3D mesh template or providing the photographed image of a body part of the user corresponding to the target area as the template based on a selection of the user or previously stored information about the user.

16. The apparatus of claim 11, wherein the controller is further configured to create the augmented reality content by combining data representing the input user content and metadata of the target area with each other.

17. The apparatus of claim 16, wherein the controller is further configured to perform rendering so that the created augmented reality content is applied to the target area of the image by performing rendering by using data obtained through the combination so that the created augmented reality content is overlapped and displayed on the target area.

18. The apparatus of claim 11, wherein the controller is further configured to perform rendering so that the created augmented reality content is applied to the target area of the image by performing rendering so that the created augmented reality content is overlapped and displayed on the target area of the image for a period that is determined based on a request and payment of the user.

* * * * *